US008085139B2

(12) United States Patent
Kanevsky et al.

(10) Patent No.: US 8,085,139 B2
(45) Date of Patent: Dec. 27, 2011

(54) BIOMETRIC VEHICULAR EMERGENCY MANAGEMENT SYSTEM

(75) Inventors: Dimitri Kanevsky, Ossining, NY (US); Roberto Sicconi, Ridgefield, CT (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 11/621,382

(22) Filed: Jan. 9, 2007

(65) Prior Publication Data

US 2008/0167757 A1 Jul. 10, 2008

(51) Int. Cl.
*B60Q 1/00* (2006.01)

(52) U.S. Cl. ..................... 340/436; 340/439; 340/425.5; 701/301

(58) Field of Classification Search ............... 340/425.5, 340/517, 521, 522, 539.22, 539.25, 575, 340/576, 901–905, 436, 439; 701/45, 48, 701/301, 302
See application file for complete search history.

(56) References Cited

U.S. PATENT DOCUMENTS

| | | | | |
|---|---|---|---|---|
| 6,060,989 | A * | 5/2000 | Gehlot | 340/576 |
| 6,236,968 | B1 | 5/2001 | Kanevsky et al. | |
| 6,293,361 | B1 * | 9/2001 | Mueller | 180/272 |
| 6,420,977 | B1 * | 7/2002 | Corbitt et al. | 340/937 |
| 6,792,339 | B2 | 9/2004 | Basson et al. | |
| 6,940,448 | B2 * | 9/2005 | Knoop et al. | 342/70 |
| 7,183,932 | B2 * | 2/2007 | Bauer | 340/575 |
| 2005/0057372 | A1 * | 3/2005 | Taylor | 340/901 |
| 2005/0192730 | A1 | 9/2005 | Churchill et al. | |
| 2007/0021915 | A1 * | 1/2007 | Breed et al. | 701/301 |

* cited by examiner

*Primary Examiner* — Daniel Wu
*Assistant Examiner* — Nay Tun
(74) *Attorney, Agent, or Firm* — Anne V. Dougherty; Ryan, Mason & Lewis, LLP

(57) ABSTRACT

Techniques for managing vehicular emergencies are disclosed. For example, a method of managing a vehicular emergency includes the steps of collecting biometric data regarding at least one occupant of a vehicle, collecting data regarding at least one operational characteristic of the vehicle, and detecting vehicular emergencies through analysis of at least a portion of the biometric data and the operational characteristic data. This method may also include communicating at least one message relating to the data, wherein the content of the message is determined by the processing device based at least in part on the data and/or controlling a function of the vehicle in response to the data. The method may also include collecting data regarding at least one operational characteristic of at least one proximate vehicle.

22 Claims, 6 Drawing Sheets

100

BIOMETRIC VEHICULAR EMERGENCY MANAGEMENT SYSTEM

FIELD OF THE INVENTION

The present invention relates generally to the field of vehicle safety, and more particularly to the use of vehicle sensors, biometric data, and/or facial recognition to detect hazardous driving situations and/or enable an emergency response navigation system to prevent injury.

BACKGROUND OF THE INVENTION

Despite continuing improvements in automotive safety technology, automobile accidents remain a leading cause of death and serious injury. Recently, efforts have been made to apply advances in computing technology to improve automotive safety. One promising area has been the use of various sensors inside and outside of the vehicle to warn the driver of potentially hazardous conditions (e.g., lane departure warning systems) or to even to implement adjustments to the vehicle's operation to ensure safety (e.g., antilock brakes).

However, existing approaches use exclusively biometrics (e.g., artificial passengers) or exclusively vehicle sensors (e.g., "black box" devices). Furthermore, existing approaches teach only passively monitoring these sensors. Likewise, existing approaches teach only monitoring this data with regard to one vehicle at a time. Accordingly, it would be highly desirable to provide improved techniques in the integration of biometric sensors in automotive safety technology in order to provide enhanced detection and management of vehicular emergencies.

SUMMARY OF THE INVENTION

Principles of the invention provide improved techniques for management of vehicular emergencies by incorporating biometric data with vehicular operational data.

By way of example, in one aspect of the present invention, a method of managing a vehicular emergency includes the steps of collecting biometric data regarding at least one occupant of a vehicle, collecting data regarding at least one operational characteristic of the vehicle, and detecting an existence of one or more vehicular emergencies through analysis of at least a portion of the biometric data and the operational characteristic data. This method may also include communicating a message relating to the one or more vehicular emergencies, wherein the content of the message is determined by a processing device based at least in part on the analysis. This method may also include controlling at least one function of the vehicle in response to the analysis. The method may also include collecting data regarding at least one operational characteristic of at least one proximate vehicle and/or communicating and coordinating with at least one other vehicle.

In another aspect of the present invention, a vehicular emergency management system includes at least one biometric monitor for collecting biometric data regarding at least one occupant of a vehicle, at least one sensor for collecting data regarding at least one operational characteristic of the vehicle, and a processing device coupled to the monitor and sensor, capable of detecting at least one vehicular emergency through analysis of at least a portion of the biometric data and the operational characteristic data. This system may also include a communicator for communicating a message relating to the one or more vehicular emergencies, wherein the content of the message is determined by a processing device based at least in part on the analysis.

Advantageously, principles of the invention provide enhanced techniques for detecting and managing vehicular emergencies based on analysis of data regarding both a vehicle and its occupants. Principles of the invention also provide for automatic overriding of manual control of a vehicle in situations where enhanced data analysis and more responsive driving is required. Principles of the invention also permit management of dangerous traffic vehicular situations by interacting and controlling one or more of the vehicles involved.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
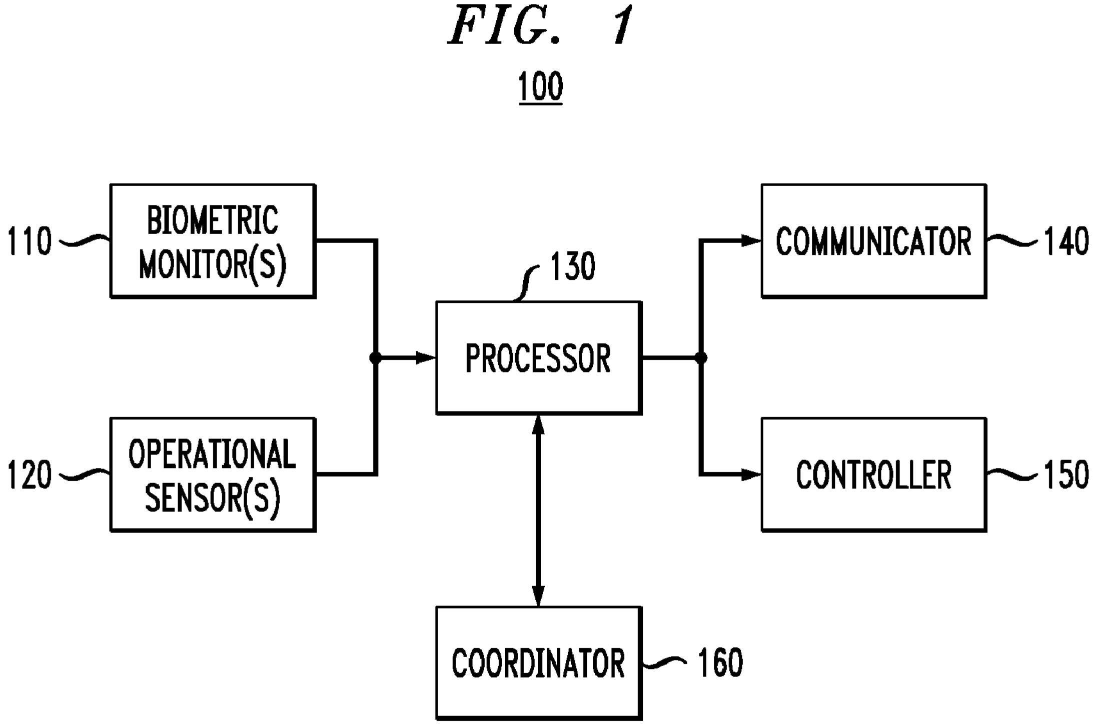
FIG. 1 is a diagram which illustrates a vehicular emergency management system, according to an embodiment of the invention.

Referring to FIG. 1, an exemplary embodiment of the invention is vehicular emergency management system 100 that analyzes biometric data and vehicle operational data to control and manage hazardous driving events. It is understood that at least a portion of system 100 resides in a vehicle in order to provide that vehicle with emergency management functions. As shown, system 100 includes processor 130, which may encompass hardware, software, firmware, or any combination thereof and which receives data from a variety of biometric sensors 110 and vehicular operational sensors 120 deployed throughout the interior and exterior of the vehicle, as discussed below in reference to FIG. 2. This data is analyzed by processor 130, which is discussed further below in reference to FIG. 3, to determine the probable occurrence of a vehicular emergency. System 100 may also include communicator 140, which alerts the driver or other occupants as to the vehicular emergency, and/or controller 150, which alters the operation of the vehicle so as to eliminate or at least mitigate the emergency.

For example, if a driver realizes that an accident is about to occur, biometric sensors 110 detect, for example, an increased rate of both circulation and respiration, a facial expression of shock or fear, and/or an intensified and/or sweatier grip on the steering wheel. If the driver is not paying attention, the initial reaction may occur with a passenger, who may have a similar increase in heart rate and change in facial expression and may also shout a warning to driver, e.g., "Look out!" Similarly, if the driver has fallen asleep or lost consciousness and is no longer able to control the car, the biometric monitors 110 will notice a decreased heart and breathing rate, a blank facial expression and/or closed eyes, a weaker grip on the steering wheel, and perhaps noises such as snoring or agonal exclamations.

Likewise, vehicular operational sensors 120 detect abnormal vehicle operation. For example, it may sense that a driver is overcompensating for a skid or that a tire has ruptured. In many such vehicular emergencies, drivers are incapable of reacting with sufficient speed and/or precision to avoid an accident. Since a computer system can process information and applications much faster than a human, such a system can control a vehicle more efficiently than a human in high-risk vehicular situations.

The biometric data can then be combined with information about the vehicle's position, speed, and acceleration to determine the danger level of a certain scenario. If a threshold is reached, the system can quickly calculate the best action or route to take to avoid and minimize harm or damage. Accordingly, the combination of biometric sensors 110 and vehicle operational sensors 120 can permit more precise control in such situations.

System 100 also includes a communicator 140 to alert the driver or other passengers of the existence of a vehicular emergency. This communicator may be a simple dashboard warning light or a synthesized voice warning, e.g. "Wake up!" or "Turn left!" It may also be capable of communicating with external individuals, for example, summoning emergency medical technicians in the event of an accident or medical emergency.

Further, system 100 includes controller 150 which is capable of overriding the driver and controlling one or more vehicular operations. For example, if the system's calculations indicate that it is possible to keep the vehicle from incurring any type of impact, the system will override the driver's ability to control the vehicle and carry out necessary applications and functions to steer the car out of danger.

In many dangerous driving vehicular situations impact is unavoidable. In these vehicular situations the system may perform the necessary function to maximize the safety of the driver, passenger, and any other vehicle. Actions like deploying safety devices and adjusting the position of the car can be used to minimize the danger of an impact. For example, if the system determines that an impact is unavoidable; airbags can be deployed prior to impact to reduce injury. Depending on the position of the car impact can affect the driver differently. Therefore, the system can attempt to modify the position of the car in reference to the object it will contact to reduce injury.

Additionally, system 100 includes a coordinator 160 capable of exchanging data with and/or coordinating actions with similar systems in surrounding vehicles in order to create a network and thus maximize the safety of all the vehicles involved. For example, if two cars are approaching each other at high speeds, with the possibility of an accident, the system can choose the safest paths for both cars to avoid an accident or at least minimize damage.

Figure 2:
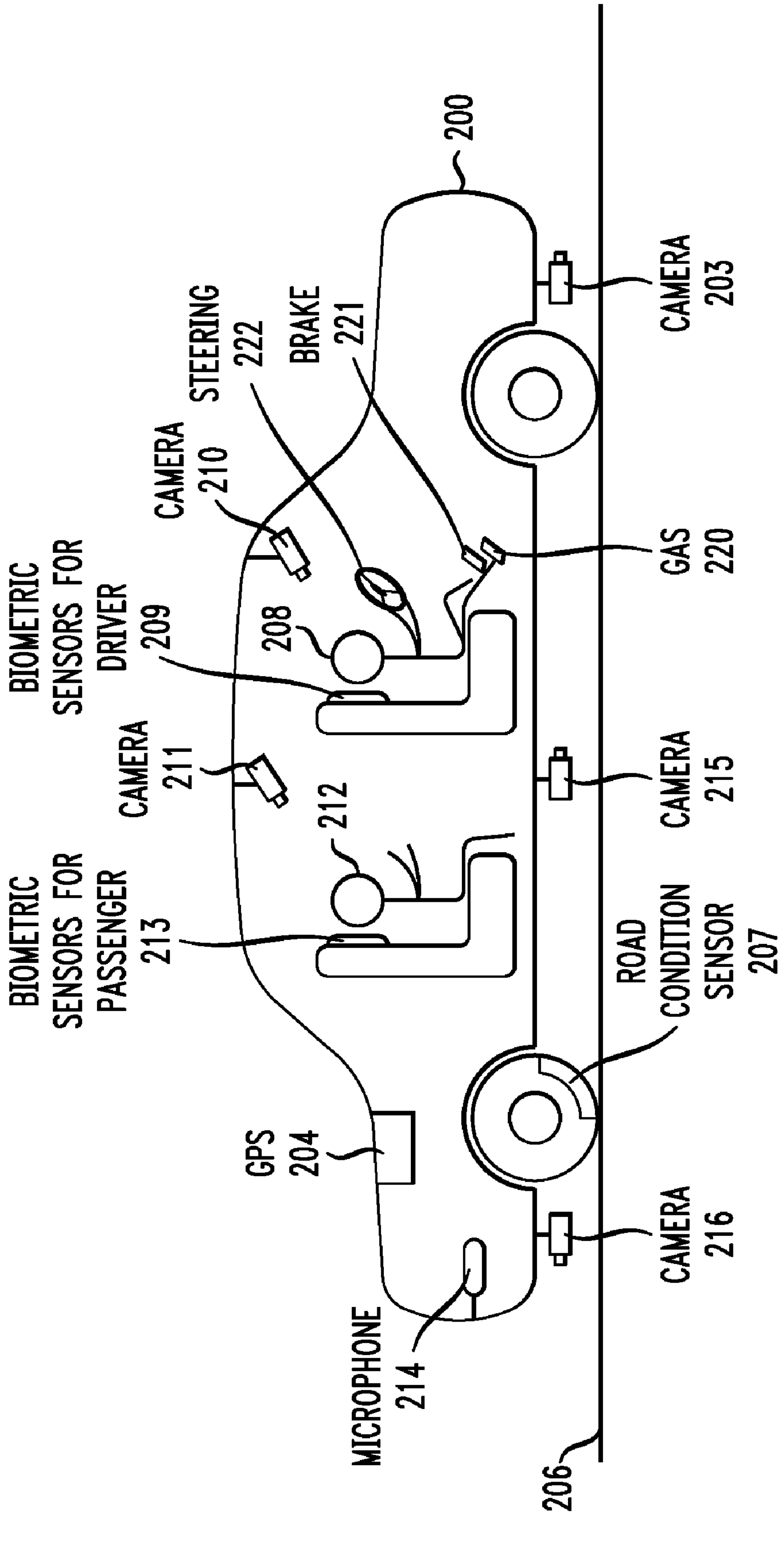
FIG. 2 is a diagram which illustrates sensors for use in a vehicular emergency management system, according to an embodiment of the invention.

FIG. 2 illustrates sensors which may be present in an illustrative embodiment of the invention. A vehicle 200 may contain a variety of sensors and devices that are linked to the processor (130 in FIG. 1). It is understood that, for the sake of simplicity, other components of vehicle emergency management system 100 (FIG. 1) are not shown. The operational sensors and devices (120 in FIG. 1) may include a GPS 204; cameras in the front 203, rear 215, and sides 216 of the vehicle; and road condition sensor 207. The global positioning system receiver (GPS) 204 determines the velocity, acceleration, and surroundings of the vehicle. The cameras aids in object recognition of objects surrounding the car. The system may also include operational sensors in the gas pedal 220, brake pedal 221, and steering wheel 222 to monitor acceleration, braking, and turning, respectively, in order to ensure they conform to set measures and limitations of the car's capabilities. The steering wheel may also contain biometric sensors to measure the intensity of the grip and any changes in galvanic skin responses due to increased sweating.

A vehicle may also contain a variety of biometric sensors and devices 110. For example, biometric sensors 209 for the driver 208 are positioned on the driver's seat and steering wheel 222 and biometric sensors 213 for each passenger are located in each seat. These sensors are capable of monitoring a broad range of biometric indicators in order to detect altered arousal states. For example, an increase in heartrate and breathing may indicate shock or fear associated with a passenger's realization of palpable danger. Likewise, a decrease and/or cessation of a driver's breathing and circulation is likely to indicate that the driver is no longer capable of controlling the vehicle (e.g., is incapacitated, intoxicated, unconscious, or asleep) and that a passenger and/or the system itself may need to take control. Additionally, cameras monitor the facial expressions of both driver 211 and passenger 210 and a microphone 214 located in the vehicle records any conversations or exclamations, e.g., "Oh no!" or "Look out!"

Figure 3:
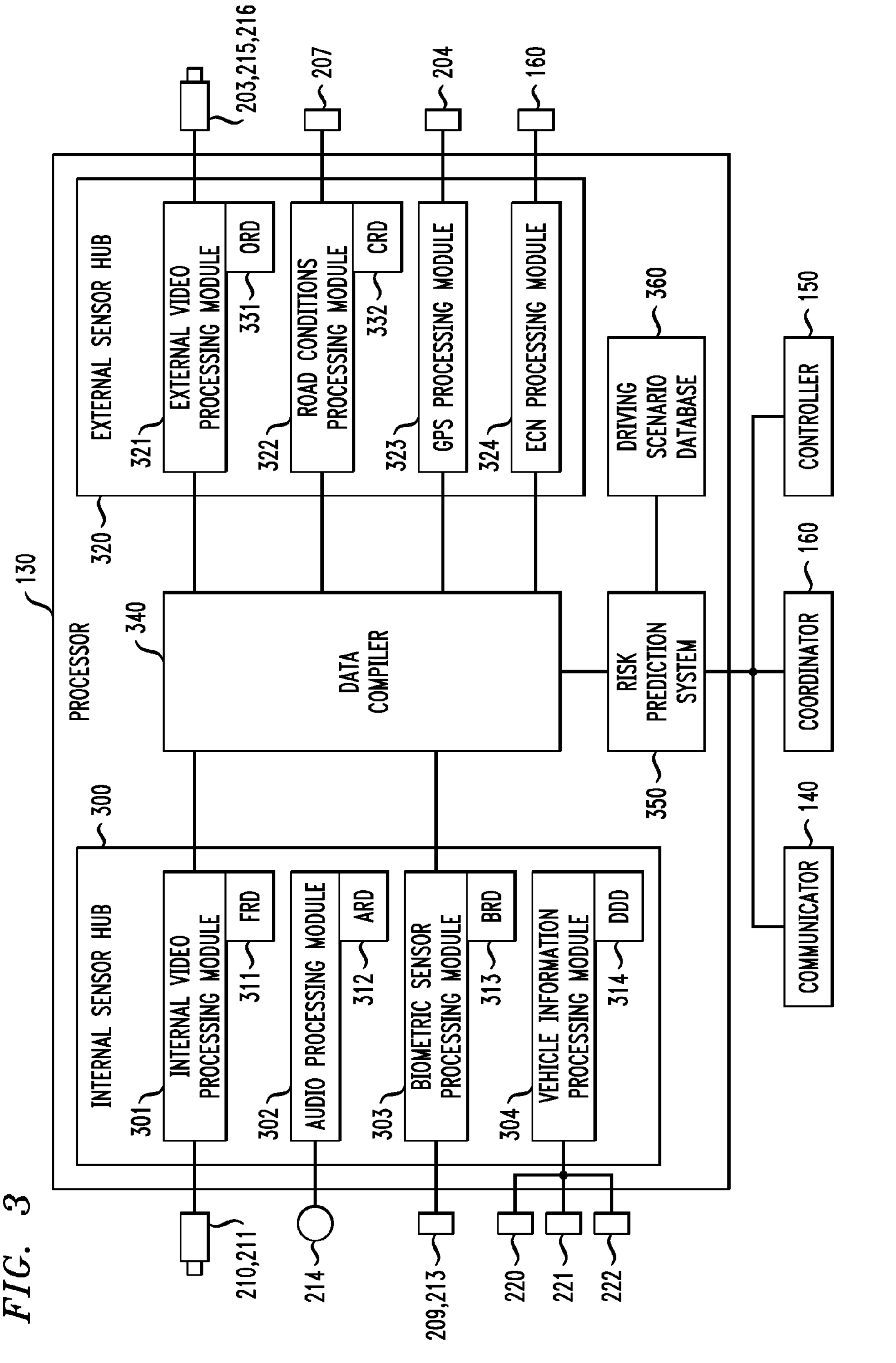
FIG. 3 is a diagram which illustrates a processor for use in a vehicular emergency management system, according to an embodiment of the invention.

FIG. 3 illustrates an exemplary embodiment of processor 130. The processor contains various processing modules that assist in creating the most effective response system in dangerous driving vehicular situations. Internal sensor hub 300 includes internal video processing module 301, audio processing module 302, biometric sensor processing module 303, and vehicle information processing module 304.

Internal video processing module 301 receives input from cameras 211, 210 within the vehicle that monitors the movements and facial expressions of driver 208 and passenger 212 and is linked to facial recognition database (FRD) 311, which provides necessary data on facial expressions that indicate, for example, shock or fear. Audio processing module 302 receives audio data from microphone 214 and is linked to audio recognition database (ARD) 312 which provides necessary data on sounds that may be associated with are associated with a vehicular emergency. For example, a person may scream or shout, "Oh no!" as they are about to impact a car.

Biometric sensor processing module 303 receives input on the driver's and passengers' heart rate and other biometric measures from biometric sensors 209, 213 within the car. Biometric recognition database 313 provides data on the measures that indicate the driver or passenger is in an altered arousal state, for example, in shock, intoxicated, or unconscious. Vehicle information processing module 304 receives information from various operational sensors within the car including gas 220 and brake pedals 221; steering wheel 222; and GPS 204. These sensors collect data regarding the acceleration, direction, velocity, and position of the vehicle. Dangerous driving database (DDD) 314 provides data on various vehicle actions that are considered indicative of a vehicular emergency; for example, differentiating a sudden stop in the middle of a highway from a stop at the end of a driveway.

External sensor hub 320 receives information from devices and sensors outside the vehicle. External video processing module 321 receives video data from external cameras 203, 215, 216. Object recognition database (ORD) 331 provides information so external video processing module 321 may determine the identity of objects surrounding the car. Road conditions processing module 322 receives information from the road condition sensor 207. Condition recognition database (CRD) 332 provides data in order to determine the road conditions (e.g. whether the road is wet, icy, dry, etc.) GPS processing module 323 receives data from GPS device 204.

External coordination network processing module 324 receives data from surrounding vehicles via the coordinator 160. In some cases, the occupant(s) of a vehicle may lack the experience or attentiveness to be aware of the risks entailed by the current operation of that vehicle. In such an instance, the biometric indicators associated with fear may first arise in occupants of surrounding vehicles and would be first captured by the biometric sensors located in their vehicles. For example, a driver who is distracted and does not notice that a child has just darted in front of his car may not demonstrate fear and its associated biometric indicators; however, surrounding drivers may notice this hazardous situation and, accordingly, exhibit the altered arousal state associated with a realization that one is about to witness an accident. In this case, the surrounding vehicles may convey this biometric data to the first vehicle which may then combine it with operational data regarding the first vehicle in order to determine an appropriate corrective response for the first vehicle.

Internal sensor hub 300 sends information from all the internal sensors and devices to data compiler 340. External sensor hub 320 sends information from all external sensors and devices to data compiler 340. Data compiler 340 organizes data in a manner so that it maybe quickly sent to the risk prediction module 350, e.g., by transforming data into a common format. By using a data compiler 340, information can be organized more efficiently and transmitted faster to the risk prediction module 350 than if the sensors and devices transmitted directly to the risk prediction module 350. Risk prediction module 350 determines with what probability a vehicular emergency (e.g. impact) will occur. If this probability exceeds a threshold level communicator 140 and/or controller 150 modules are activated to take corrective actions. In making this calculation, risk prediction system 350 uses a driving scenario database 360 which provides data regarding the most efficient way to maximize the safety of the driver, passenger, and vehicle. It also uses a GPS, road and traffic databases, data from surrounding cars, and sensors such as a camera, object recognition system, and a surface condition sensor. GPS will be used to deteimine the car's velocity and acceleration as well as some of its surroundings (physical landscapes like buildings, roads, bodies of water, etc.) Road and traffic databases will provide data on road conditions and material where the vehicle is located. Data from surrounding cars will be used to design a safe path so the system can control the vehicle without increasing the risk of other drivers and passengers. The external sensors will be used to contribute to designing a safe path so the vehicle can avoid danger.

Figure 4:
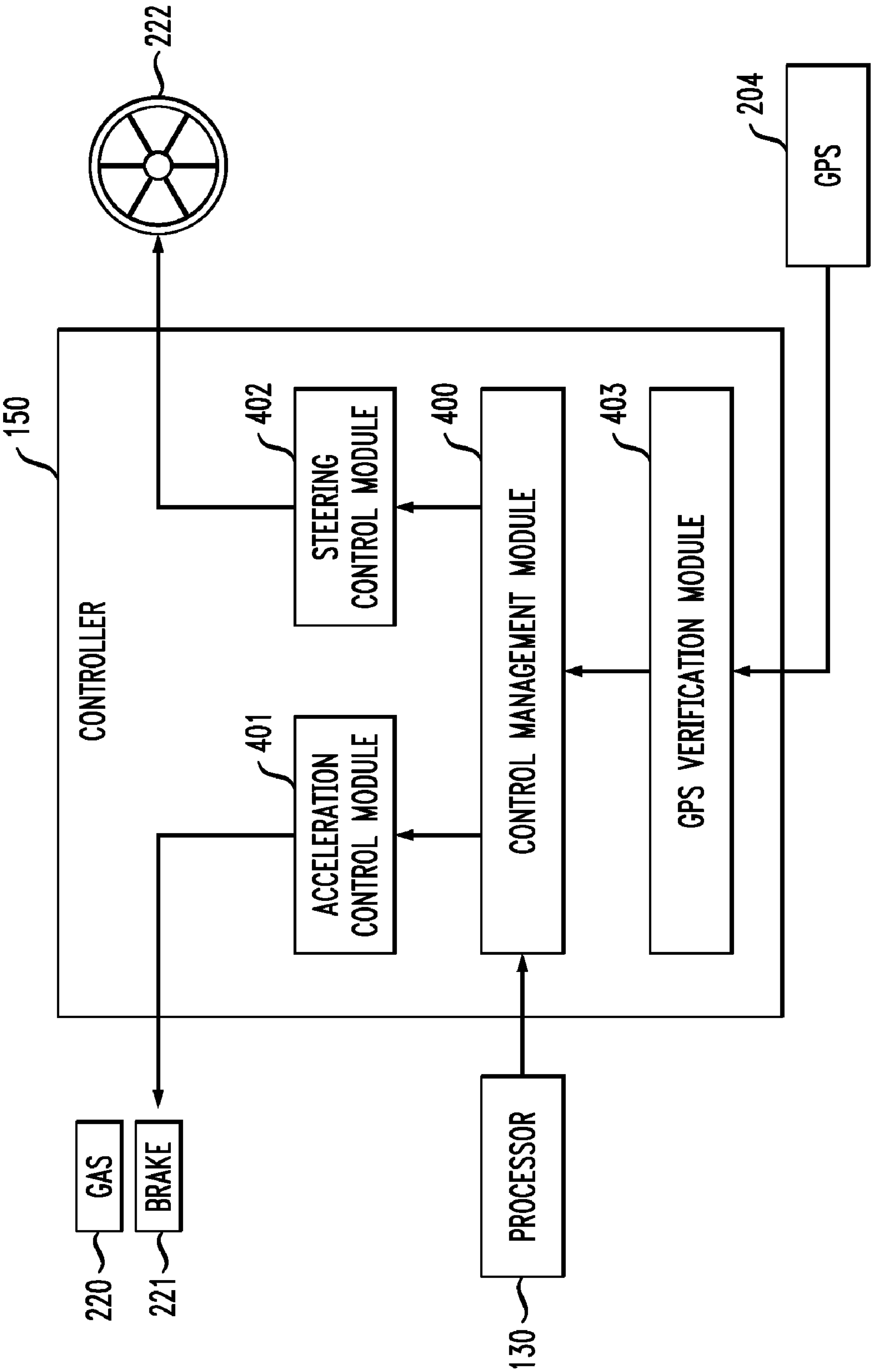
FIG. 4 is a diagram which illustrates a controller for use in a vehicular emergency management system, according to an embodiment of the invention.

FIG. 4 is a diagram which illustrates a controller for use in a vehicular emergency management system, according to an embodiment of the invention. As discussed above in reference in FIG. 3, processor 130 notifies controller 150 of a likely vehicular emergency and suggested corrective action. Control management module 400 determines exactly what adjustments to acceleration and steering are necessary in order to safely implement the suggested corrective action. Acceleration control module 401 implements these adjustments by manipulating the gas 220 and brake 221 pedals. Likewise, steering control module 402 implements adjustments to steering by redirecting the steering wheel 222. GPS verification module 403 uses data from GPS 204 to determine whether these adjustments have successfully avoided or mitigated the emergency.

Figure 5:
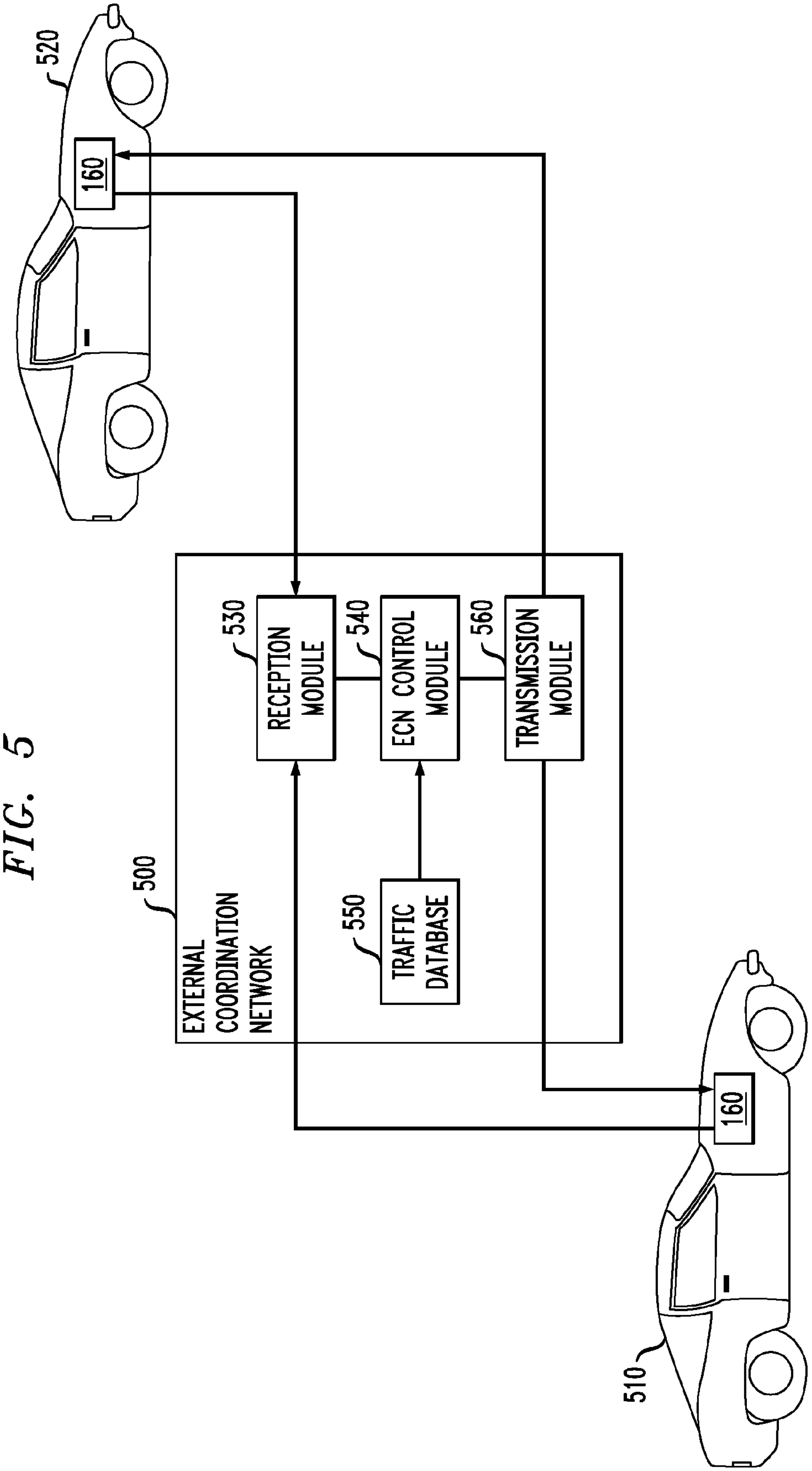
FIG. 5 is a diagram which illustrates an external coordination network for use with a vehicular management system, according to an embodiment of the invention.

FIG. 5 is a diagram which illustrates an external coordination network (ECN) for use in conjunction with a vehicular emergency management system, according to an embodiment of the invention. This external coordination network 500 is an external module which, in some embodiments, can work with internal coordinators 160 to better coordinate a multitude of vehicles. Reception module 530 acquires information from coordinators 160 found within vehicles 510, 520 regarding the operation of these vehicles. ECN control module 540 uses this information to determine what adjustments should be made to the operation of each vehicle in order to ensure a safe and smooth traffic pattern. ECN control module 540 may use a traffic database 550 to determine optimal traffic patterns. Information regarding the adjustments will then be transmitted back to the respective vehicles 510, 520 via transmission module 500.

Figure 6:
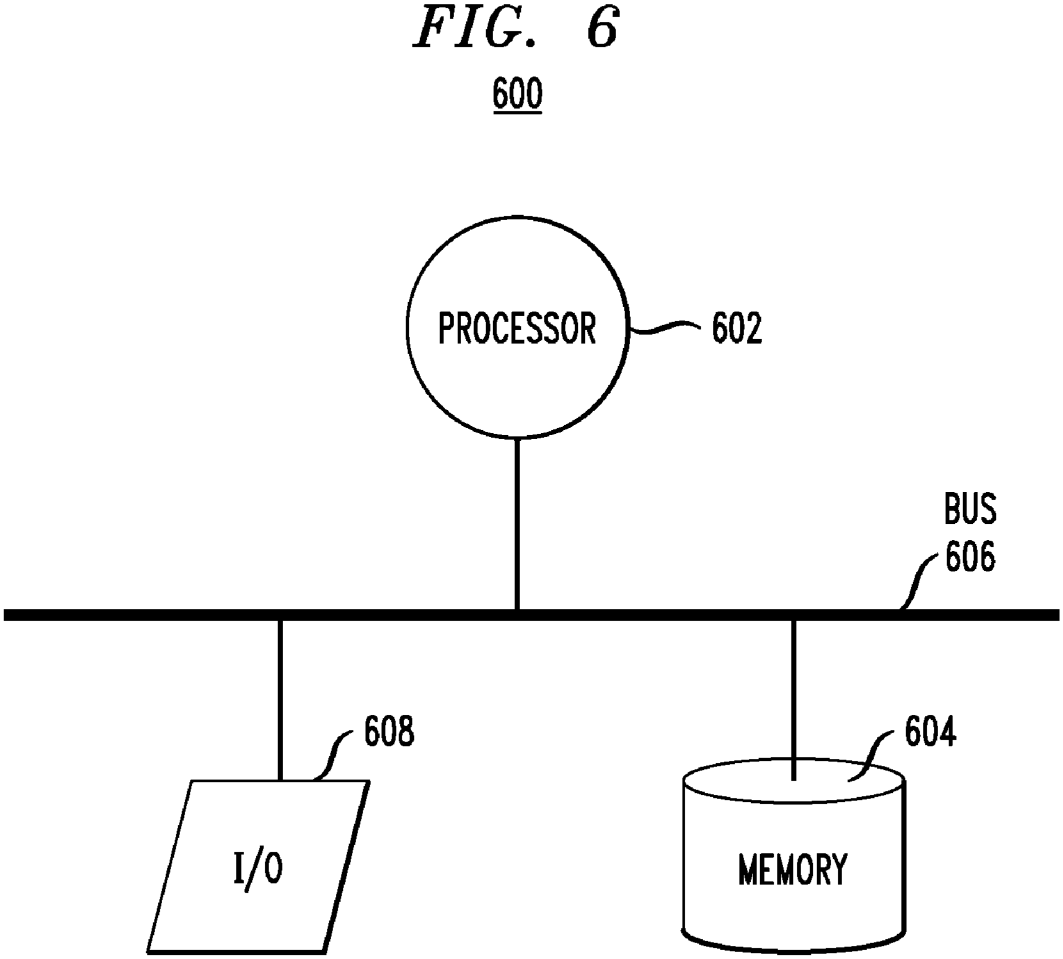
FIG. 6 is a diagram which illustrates an exemplary processing system in which techniques of the present invention may be implemented.

The methodologies of embodiments of the invention may be particularly well-suited for use in an electronic device or alternative system. For example, FIG. 6 is a block diagram depicting an exemplary processing system 600 formed in accordance with an aspect of the invention. System 600 may include a processor 602, memory 604 coupled to the processor (e.g., via a bus 606 or alternative connection means), as well as input/output (I/O) circuitry 608 operative to interface with the processor. The processor 602 may be configured to perform at least a portion of the methodologies of the present invention, illustrative embodiments of which are shown in the above figures and described therein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 602. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A vehicular emergency management system, the vehicular emergency management system comprising:

at least one biometric monitor for collecting biometric data regarding at least one occupant of a vehicle;

at least one sensor for collecting data regarding at least one operational characteristic of the vehicle;

at least one module for collecting biometric data regarding at least one occupant of at least one proximate vehicle; and a processing device coupled to the monitor, the module, and the sensor, operative to detect at least one vehicular emergency of the vehicle through analysis of at least a portion of the biometric data from the monitor and the module, and the operational characteristic data;

wherein the analysis comprises determining, based at least in part on the biometric data regarding the at least one occupant of the at least one proximate vehicle, that the at least one occupant of the proximate vehicle has a realization of danger of the vehicle.

2. The vehicular emergency management system of claim 1, further comprising:

a communicator, coupled to the processing device, for transmitting a message relating to the at least one vehicular emergency, wherein the content of the message is determined by the processing device based at least in part on the analysis.

3. The vehicular emergency management system of claim 1, further comprising:

a controller, coupled to the processing device, for controlling at least one function of the vehicle in response to the analysis.

4. The vehicular emergency management system of claim 1, wherein the biometric data is suitable for determining an altered emotional state of the at least one occupant.

5. The vehicular emergency management system of claim 1, wherein the biometric data is selected from a group comprising cardiac rhythm, respiratory rhythm, galvanic skin response, physical movement, facial expression, and auditory exclamations.

6. The vehicular emergency management system of claim 1, wherein the operational characteristic is selected from a group comprising position, velocity, acceleration, road conditions, and vehicle structural integrity.

7. The vehicular emergency management system of claim 1, further comprising:

at least one module for collecting data regarding at least one operational characteristic of at least one proximate vehicle.

8. The vehicular emergency management system of claim 1, further comprising:

a module for communicating and coordinating with at least one other vehicle.

9. A method of detecting at least one vehicular emergency of a vehicle, the method comprising the steps of:

collecting biometric data regarding at least one occupant of the vehicle;

collecting biometric data regarding at least one occupant of at least one proximate vehicle;

collecting data regarding at least one operational characteristic of the vehicle; and detecting the at least one vehicular emergency of the vehicle through analysis by a processor of at least a portion of the biometric data from the at least one occupant of the vehicle and the at least one occupant of the proximate vehicle and the operational characteristic data;

wherein the analysis comprises determining, based at least in part on the biometric data regarding the at least one occupant of the at least one proximate vehicle, that the at least one occupant of the proximate vehicle has a realization of danger of the vehicle.

10. The method of claim 9, further comprising the step of:

communicating a message relating to the at least one vehicular emergency, wherein the content of the message is determined by the processing device based at least in part on the analysis.

11. The method of claim 9, further comprising:

controlling at least one function of the vehicle in response to the analysis.

12. The method of claim 9, wherein the biometric data is suitable for determining an altered emotional state of the at least one occupant.

13. The method of claim 9, wherein the biometric data is selected from a group comprising cardiac rhythm, respiratory rhythm, galvanic skin response, physical movement, facial expression, and auditory exclamations.

14. The method of claim 9, wherein the operational characteristic is selected from a group comprising position, velocity, acceleration, road conditions, and vehicle structural integrity.

15. The method of claim 9, further comprising the step of:

collecting data regarding at least one operational characteristic of at least one proximate vehicle.

16. The method of claim 9, further comprising the step of:

communicating and coordinating with at least one other vehicle.

17. An article of manufacture for detecting at least one vehicular emergency of a vehicle, the article comprising a computer readable storage medium containing one or more programs which when executed implement the steps of:

collecting biometric data regarding at least one occupant of the vehicle;

collecting biometric data regarding at least one occupant of at least one proximate vehicle;

collecting data regarding at least one operational characteristic of the vehicle; and detecting the at least one vehicular emergency of the vehicle through analysis by a processor of at least a portion of the biometric data from the at least one occupant of the vehicle and the at least one occupant of the proximate vehicle and the operational characteristic data;

wherein the analysis comprises determining, based at least in part on the biometric data regarding the at least one occupant of the at least one proximate vehicle, that the at least one occupant of the proximate vehicle has a realization of danger of the vehicle.

18. The article of claim 17, wherein the programs further implement the step of:

communicating a message relating to the at least one vehicular emergency, wherein the content of the message is determined by the processing device based at least in part on the analysis.

19. The article of claim 17, wherein the programs further implement the step of:

controlling at least one function of the vehicle in response to the analysis.

20. The article of claim 17, wherein the programs further implement the step of:

communicating and coordinating with at least one other vehicle.

21. An external coordination network for use with one or more vehicular emergency management systems, comprising:

a first module for receiving at least one message from at least one vehicular emergency management system associated with at least a first vehicle, wherein at least a portion of the message is based on at least a portion of biometric data and operational characteristic data collected by the at least one vehicle emergency management system;

a second module for analyzing the at least one message received from the at least one vehicular emergency management system in order to determine at least one response; and a third module for transmitting the at least one response to the at least one vehicular emergency management system;

wherein the message is based at least in part on an analysis comprising determining, based at least in part on biometric data regarding at least one occupant of at least a second vehicle proximate the first vehicle, that at least one occupant of the at least second vehicle has a realization of danger of the at least first vehicle.

22. The vehicular emergency management system of claim 3, wherein, responsive to the analysis comprising a determination that a collision with an object is unavoidable, the controller positions the vehicle in relation to the object to reduce injury.

* * * * *